United States Patent
Zurian et al.

(10) Patent No.: US 11,225,328 B1
(45) Date of Patent: Jan. 18, 2022

(54) SYSTEM INCLUDING POCKET

(71) Applicant: B/E AEROSPACE, INC., Winston-Salem, NC (US)

(72) Inventors: Charles Zurian, Kernersville, NC (US); Dean Sears, Kernersville, NC (US); Lazaro Martinez, Clemmons, NC (US); Richard Kelley, Germanton, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 14 days.

(21) Appl. No.: 16/926,437

(22) Filed: Jul. 10, 2020

(51) Int. Cl.
*B64D 11/06* (2006.01)
*B60R 7/00* (2006.01)
*A47C 7/62* (2006.01)

(52) U.S. Cl.
CPC .......... *B64D 11/0636* (2014.12); *A47C 7/622* (2018.08); *B60R 7/005* (2013.01)

(58) Field of Classification Search
None
See application file for complete search history.

(56) References Cited

U.S. PATENT DOCUMENTS

| | | | |
|---|---|---|---|
| 5,292,174 A * | 3/1994 | Ohnuma | B60R 7/043 297/188.07 |
| 7,997,635 B2 | 8/2011 | Ercolano et al. | |
| 8,152,234 B2 | 4/2012 | Terleski et al. | |
| 10,246,022 B2 * | 4/2019 | Perrin | B60R 7/005 |
| 2008/0001423 A1 * | 1/2008 | Ercolano | B60R 7/046 296/37.8 |
| 2018/0244206 A1 | 8/2018 | Gawade et al. | |
| 2018/0334105 A1 | 11/2018 | Bryant et al. | |
| 2019/0039525 A1 * | 2/2019 | Hu | B60R 7/005 |
| 2019/0106060 A1 * | 4/2019 | Lindhorst | B60R 7/005 |
| 2019/0291870 A1 | 9/2019 | Hall | |
| 2021/0114527 A1 * | 4/2021 | Tettenborn | B29C 45/16 |

FOREIGN PATENT DOCUMENTS

| | | | | |
|---|---|---|---|---|
| BE | 809608 A * | 5/1974 | | B60R 7/005 |
| DE | 3447179 C1 | 7/1986 | | |
| DE | 102005027390 | 3/2011 | | |
| DE | 202004021894 U1 | 5/2012 | | |
| DE | 202016106446 U1 * | 1/2017 | | B60N 2/90 |
| DE | 102017122898 A1 * | 4/2019 | | B64D 11/0647 |

(Continued)

*Primary Examiner* — David E Allred
(74) *Attorney, Agent, or Firm* — Suiter Swantz pc llo (57) ABSTRACT

A system may include a surface, a pocket member, and spring members. The pocket member may have a top portion, a bottom portion, an exterior side, and an interior side. Each spring member may be positioned vertically between the surface and the interior side of the pocket member. Each spring member may have a spring top portion and a spring bottom portion. Each of the spring top portions may be attached to the top portion of the pocket member. Each of the spring bottom portions may be attached to the surface at a location corresponding to a vertical position of the bottom portion of the pocket member. The surface, the pocket member, and the spring members may form a pocket configured to at a given time be one of: open at the top portion of the pocket member, open at the bottom portion of the pocket member, or closed.

14 Claims, 11 Drawing Sheets

(56) References Cited

FOREIGN PATENT DOCUMENTS

| | | | |
|---|---|---|---|
| EP | 0899159 A2 * | 3/1999 | ............. B60R 7/005 |
| GB | 2526776 A | 12/2015 | |
| KR | 2019970001062 U | 6/1995 | |
| KR | 200451444 Y1 | 12/2010 | |
| WO | 2014193322 A1 | 12/2014 | |
| WO | 2019068603 A1 | 4/2019 | |

* cited by examiner

SYSTEM INCLUDING POCKET

BACKGROUND

Currently, aircraft seat back pockets collect trash, debris, and particles after passenger use. Cleaning pockets to remove the trash, debris, and particles is labor intensive and often overlooked. Additionally, existing aircraft seat back pockets are prone to breakage and are expensive to replace.

SUMMARY

In one aspect, embodiments of the inventive concepts disclosed herein are directed to a system. The system may include a surface, a pocket member, and spring members. The pocket member may have a top portion, a bottom portion, an exterior side, and an interior side. Each spring member may be positioned vertically between the surface and the interior side of the pocket member. Each spring member may have a spring top portion and a spring bottom portion. Each of the spring top portions may be attached to the top portion of the pocket member. Each of the spring bottom portions may be attached to the surface at a location corresponding to a vertical position of the bottom portion of the pocket member. The surface, the pocket member, and the spring members may form a pocket configured to at a given time be one of: open at the top portion of the pocket member, open at the bottom portion of the pocket member, or closed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a pocket.

In some embodiments, the pocket may be articulated and may be configured to open at a top, open at a bottom, or be closed at a given time. The pocket may be opened at the top by pulling the top away from a surface. The pocket may be opened at the bottom by pulling the bottom away from a surface. The pocket may allow for the removal of the trash, debris, and particles quickly and may only take a second to pull the pocket bottom open. Additionally, if the pocket is damaged, the pocket components can be easily and quickly replaced without replacing an entire seat back cover. Additionally, the pocket may be inexpensive compared to existing aircraft seat back pockets.

In some embodiments, the pocket may have dual articulation such that an upper lip of the pocket can be drawn back to allow an insertion and storage of items, and such that the bottom of the pocket can be drawn back to allow trash and other items to fall out for cleaning purposes.

In some embodiments, the pocket may use a flat spring approach with two identical (e.g., left and right) flat springs bent to a certain shape and then mounted to the pocket articulating form at one end of each spring, and the seat back at the other end of each spring. The springs may hold the articulating form to the back of the seat when the pocket is empty, to allow the form to retain items stored in the pocket by spring deflection, and then may allow the form to be drawn back at the bottom by the recurving of the springs.

In some embodiments, the pocket may have simple and reliable seatback mounting so that the pocket can not only move in relation to the seatback but also can maintain conformance to the seatback as differing loads may cause deformation of the seatback. Additionally, the flat spring approach can conceal the mechanism within the confines of a styled surface. Further, the pocket can easily be cleaned of debris by a simple lifting away of the bottom portion of the pocket for cleanout, which the flat springs can allow in their curvature and mounting.

Figure 1:
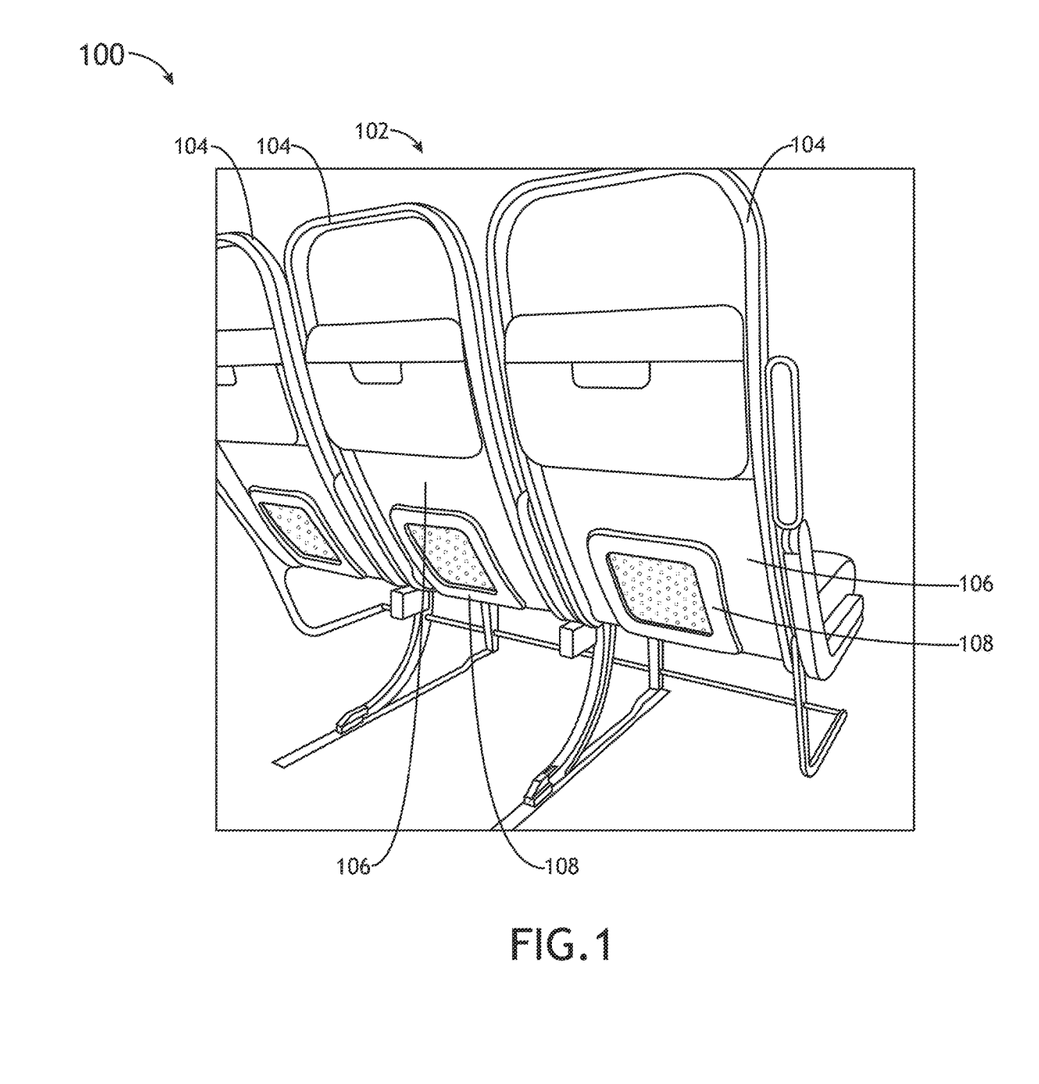
FIG. 1 is a view of an exemplary embodiment of a system including a vehicle including at least one seat according to the inventive concepts disclosed herein.
Figure 2:
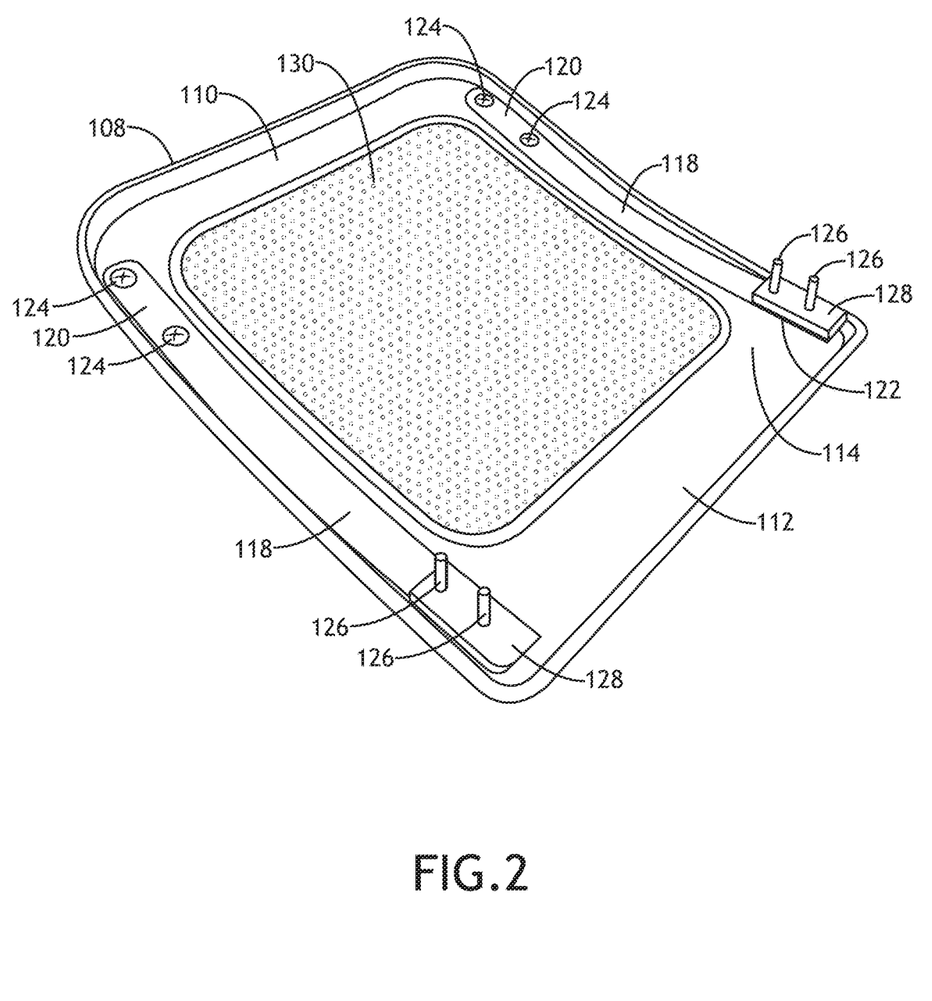
FIG. 2 is a view of an exemplary embodiment of some of the components that may form the pocket of FIG. 1 according to the inventive concepts disclosed herein.

Referring now to FIG. 1, an exemplary embodiment of a system including a vehicle (e.g., aircraft 100, watercraft, automobile, train, etc.) including at least one seat 104 (e.g., an aircraft seat) is depicted according to the inventive concepts. In some embodiments, the system may include at least one multiple seat assembly 102, which may include multiple connected seats 104 that may be installed as a row of seats 104. For example, each seat 104 may have a surface 106 on a back of the seat 104; however, in some embodiments, the surface 106 may be any suitable surface and not necessarily on a seat 104. In some embodiments, the surface 106 may be curved and include at least one curve. The system may include at least one pocket member 108 and at least two spring members (e.g., 118 as shown in FIG. 2). The surface 106, the pocket member 108, and the two spring members 118 may form a pocket configured to at a given time be one of: open at a top portion of the pocket member 108, open at a bottom portion of the pocket member 108, or closed. The system may include multiple pockets formed of multiple sets of the surface 106, the pocket member 108, and the two spring members 118. The pocket may have any suitable location in any suitable vehicle, or in any other suitable environment.

Referring now to FIG. 2, an exemplary embodiment of some of the components that may form the pocket of FIG. 1 is shown. The system may include any or all of the following: the pocket member 108, at least two spring members 118, at least one (e.g., two for each spring member 118) first fastener 124, at least one (e.g., two for each spring member 118) second fastener 126, and/or at least one (e.g., one for each spring member 118) spacer 128.

Figure 3:
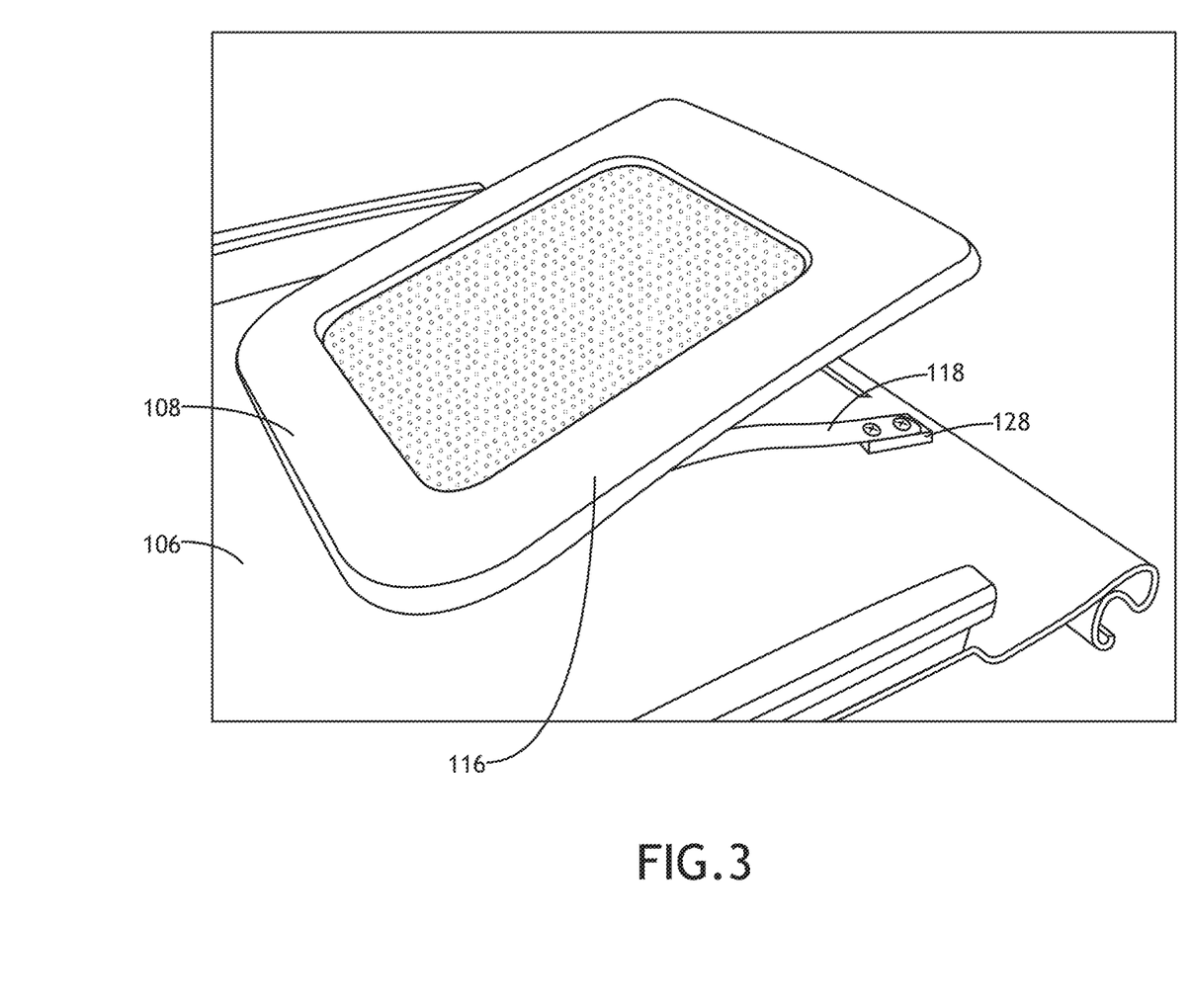
FIG. 3 is an exemplary view of the pocket of FIG. 1 according to the inventive concepts disclosed herein.

The pocket member 108 may include any or all of the following: a top portion 110 (e.g., a top half, a top one quarter, and/or a top one eighth), a bottom portion 112 (e.g., a bottom half, a bottom one quarter, and/or a bottom one eighth), an interior side 114 (e.g., which may face the surface 106), and/or an exterior side (e.g., 116, as shown in FIG. 3, which may be opposite the interior side 114). In some embodiments, the interior side 114 may conform to the surface 106, and the interior side 114 may include at least one curve if the surface 106 includes at least one curve.

In some embodiments, the pocket member 108 may include at least one rigid portion and/or at least one non-rigid portion. For example, the rigid portion may surround the non-rigid portion. For example, the rigid portion may extend vertically from the top portion 110 to the bottom portion 112. For example, the pocket member may include at least one rigid portion extending between vertical positions corresponding to the spring top portion 120 and the spring bottom portion 122 of each of the two spring members 118. For example, the pocket member 108 may include at least one non-rigid portion positioned horizontally between horizontal positions corresponding to positions of the two spring members 118. For example, the spring members 118 may be attached to the rigid portion. For example, the rigid portion may be composed of any suitable material(s), such as plastic, metal, wood, and/or carbon fiber. For example, the non-rigid material may be formed of any suitable material(s), such as mesh 130, fabric, rubber, nylon, canvas, and/or leather. In some embodiments, the non-rigid portion may be omitted.

Each of the spring members 118 may include any or all of the following: a spring top portion 120 (e.g., a top half, a top one quarter, and/or a top one eighth), a spring bottom portion 122 (e.g., a bottom half, a bottom one quarter, and/or a bottom one eighth), and/or holes configured to accommodate the fasteners 124, 126. Each of the two spring members 118 may be positioned vertically between the surface 106 and the interior side 114 of the pocket member 108. Each of the spring top portions 120 may be attached to the top portion 110 of the pocket member 108. Each of the spring bottom portions 122 may be attached to the surface 106 at a location corresponding to a vertical position of the bottom portion 112 of the pocket member 108. In some embodiments, each of the two spring members 118 may be a spring strip having flat surface portions on opposite sides of the spring strip. Each of the two spring members 118 may be composed of spring steel (e.g., 1095 steel). Each of the spring top portions 120 may be attached to the top portion 110 of the pocket member 108 with at least one first fastener 124. Each of the spring bottom portions 122 may be attached with the at least one second fastener 126 to the surface 106 at a location corresponding to a vertical position of the bottom portion 112 of the pocket member 108.

In some embodiments, the at least one first fastener 124 may be at least two rivets for each spring member 118, and the at least one second fastener 126 may be at least two screws for each spring member 118. The use of multiple fasteners at attachment locations for each spring member 118 may improve stability of the mechanism while opening or closing (e.g., from the top or bottom) the pocket. In some embodiments, any suitable number and type(s) of fasteners and/or attachment means (e.g. welding, fusing, stitches, straps, tape, and/or glue, etc.) may be used.

In some embodiments, the system may include a first spacer 128 and a second spacer 128. Each of the at least one second fastener 126 may pass through one of the two spring members 118, one of the first spacer 128 or the second spacer 128, and the surface 106. In some embodiments, the spacers 128 may serve as a mounting fixture to accommodate at least one curve of the surface 106. In some embodiments, the spacers 128 may be omitted.

The surface 106, the pocket member 108, and the two spring members 118 may form a pocket configured to at a given time be one of: open at the top portion 110 of the pocket member 108, open at the bottom portion 112 of the pocket member 108, or closed. The two spring members 118 may be configured to maintain the pocket as closed when an external force is not acting on the pocket member 108. Each of the spring top portions 120 may not be attached to the surface 106. Each of the spring bottom portions 122 may not be attached to the bottom portion 112 of the pocket member 108.

In some embodiments, the surface 106 may have at least one curve, and the interior side 114 of the pocket member 108 may conform to the surface 106. The two spring members 118 may be pre-bent to conform to the surface 106 when an external force is not acting on the pocket member 108.

Referring now to FIG. 3, an exemplary view of the pocket of FIG. 1 is shown. As shown in FIG. 3, the pocket is closed at the top portion 110 of the pocket member 108 and open at the bottom portion 112 of the pocket member 108. The bottom portion 112 of the pocket member 108 may be quickly opened at the bottom by pulling the bottom portion 112 of the pocket member 108 away from the surface 106. The pocket's ability to open at the bottom allows the contents of the pocket to be quickly removed, for example, to discard trash left by a previous passenger.

Figure 4:
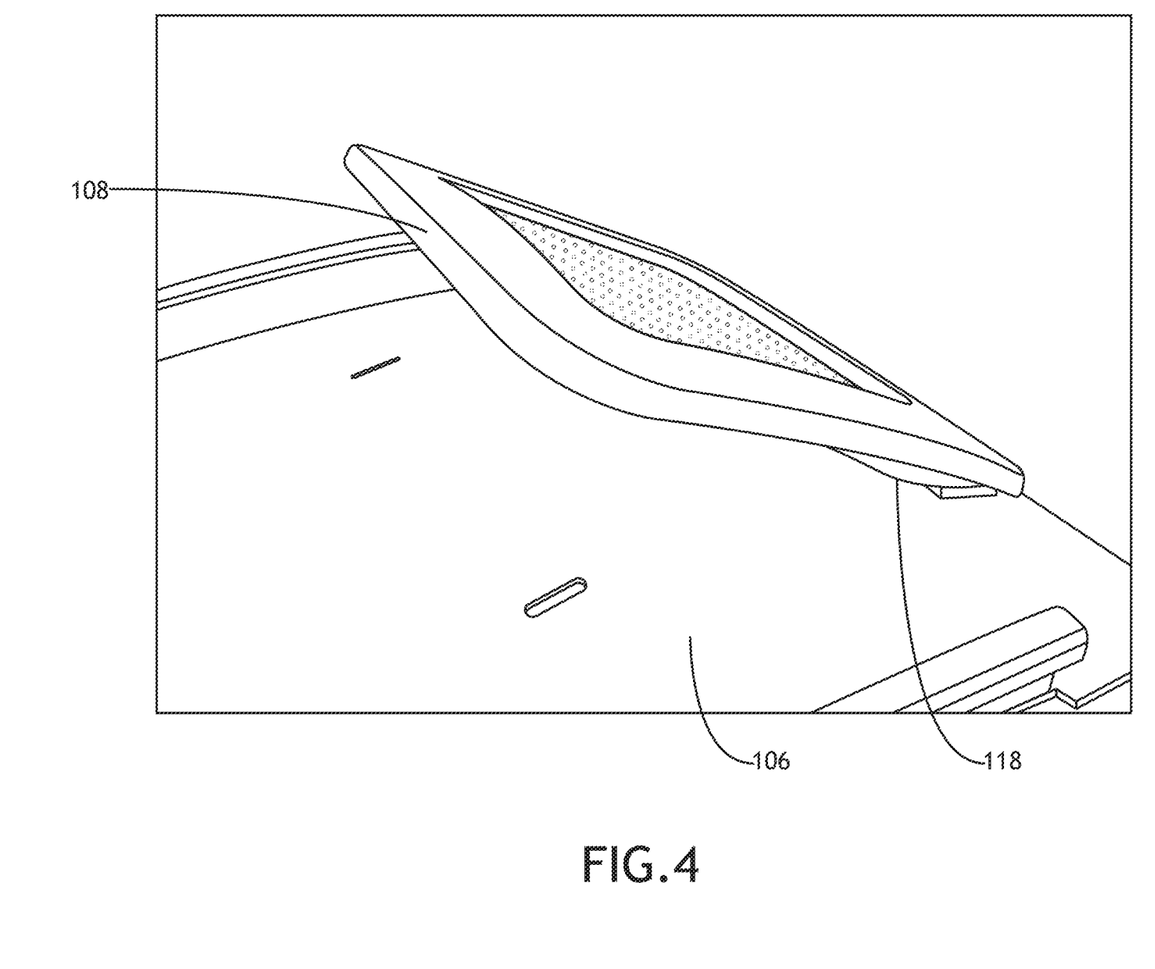
FIG. 4 is an exemplary view of the pocket of FIG. 1 according to the inventive concepts disclosed herein.

Referring now to FIG. 4, an exemplary view of the pocket of FIG. 1 is shown. As shown in FIG. 4, the pocket is open at the top portion 110 of the pocket member 108 and closed at the bottom portion 112 of the pocket member 108.

Figure 5:
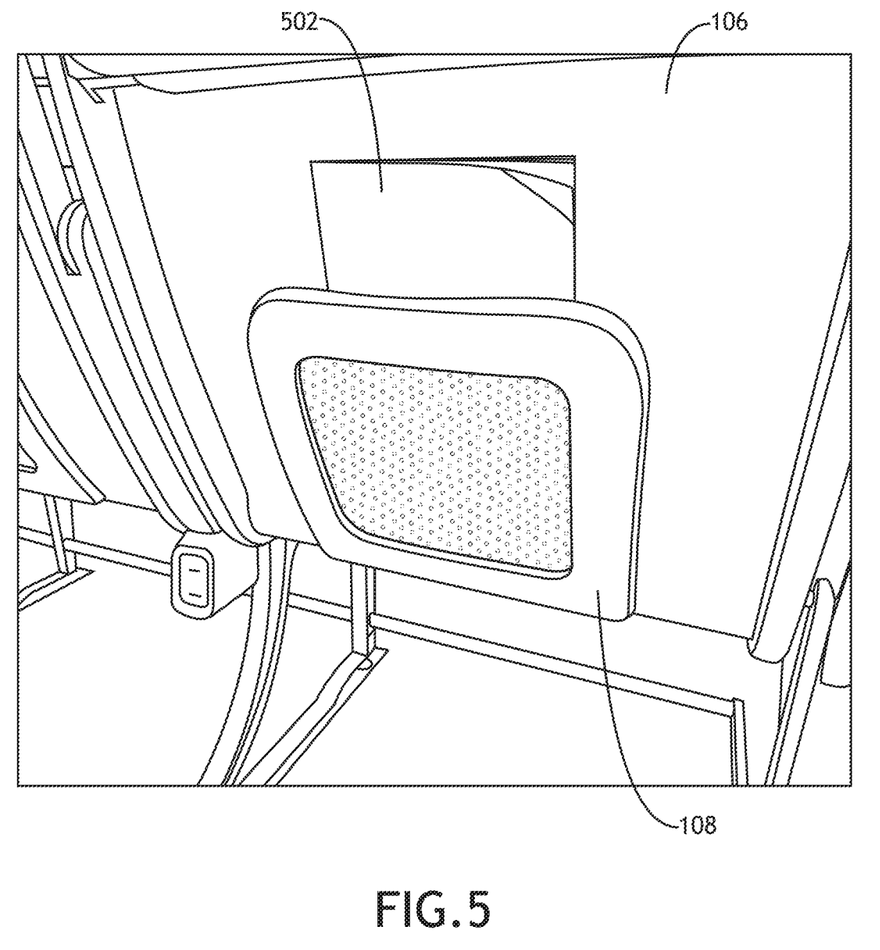
FIG. 5 is an exemplary view of the pocket of FIG. 1 according to the inventive concepts disclosed herein.

Referring now to FIG. 5, an exemplary view of the pocket of FIG. 1 is shown. As shown in FIG. 5, the pocket is closed. The pocket may be configured to hold object(s) (e.g., literature 502).

Figure 6:
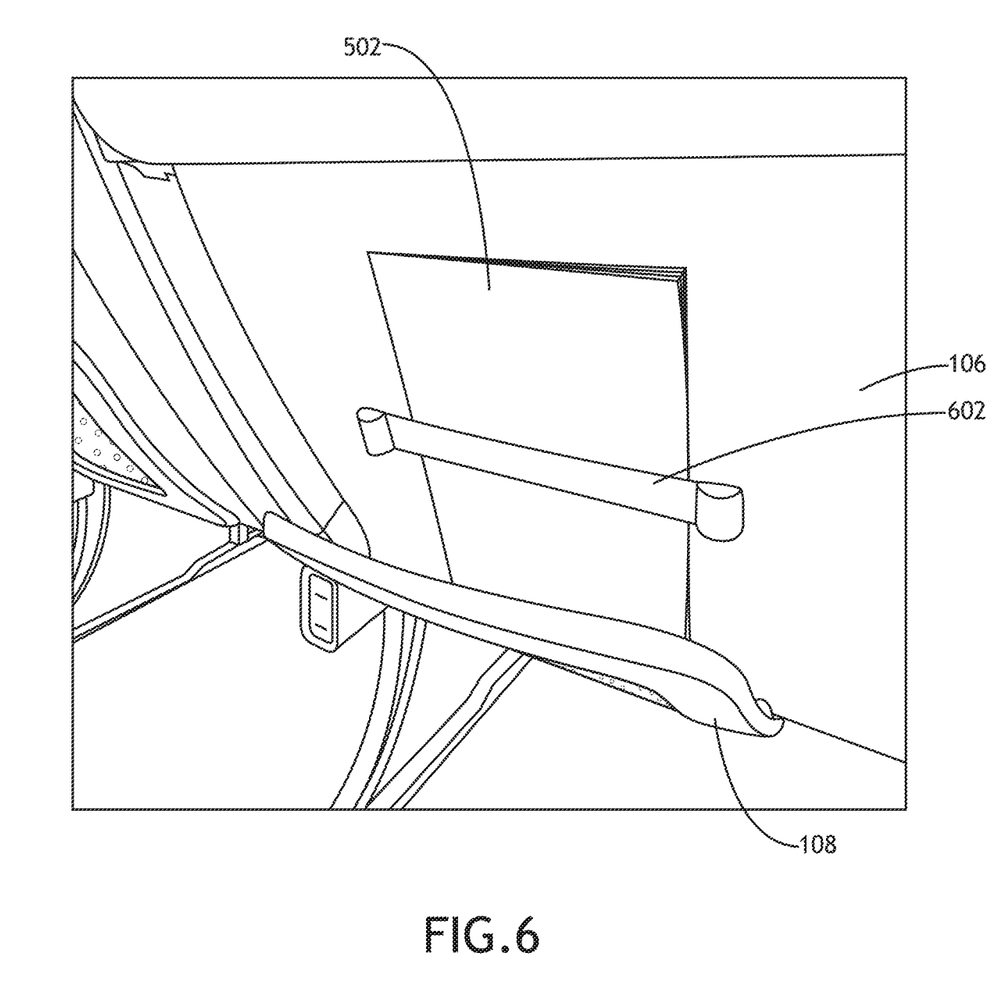
FIG. 6 is an exemplary view of the pocket of FIG. 1 according to the inventive concepts disclosed herein.

Referring now to FIG. 6, an exemplary view of the pocket of FIG. 1 is shown. As shown in FIG. 6, the pocket is open at the top portion 110 of the pocket member 108 and closed at the bottom portion 112 of the pocket member 108. The literature 502 may be held in place by an elastic strap 602 attached to the surface 106.

Figure 7:
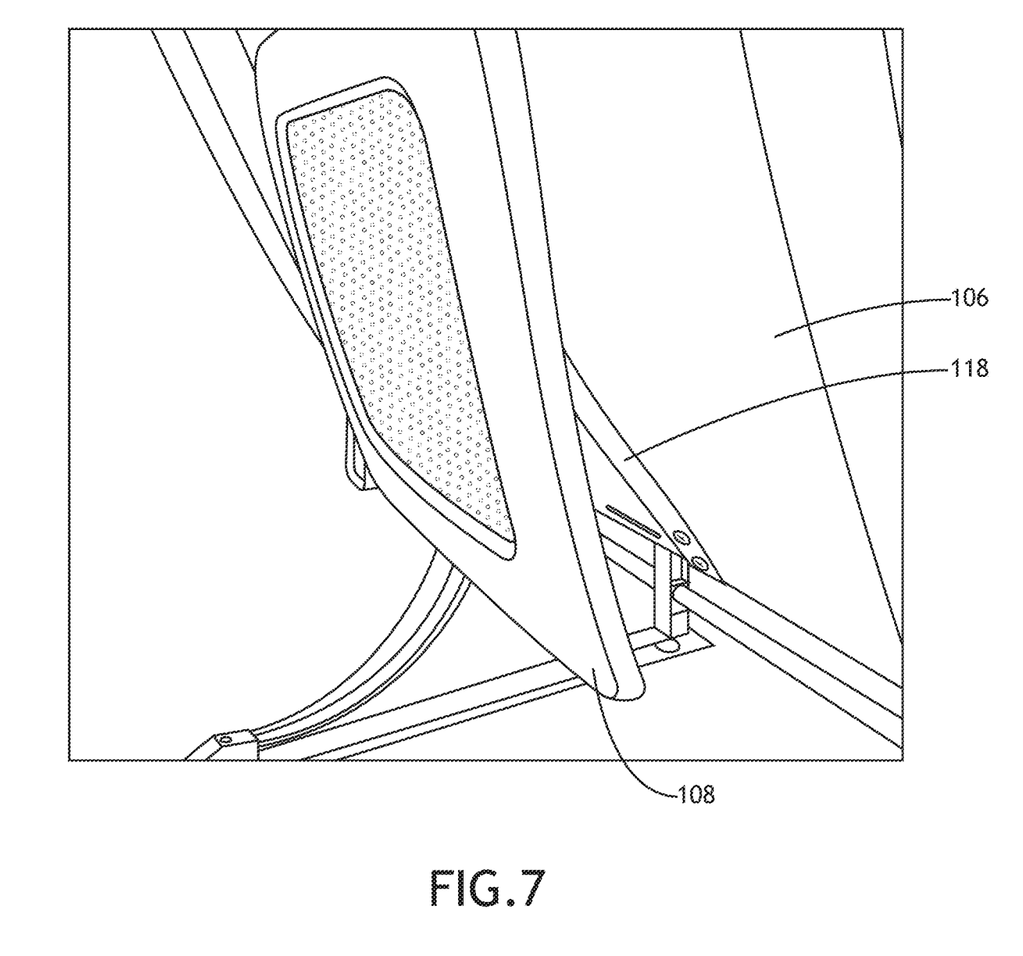
FIG. 7 is an exemplary view of the pocket of FIG. 1 according to the inventive concepts disclosed herein.

Referring now to FIG. 7, an exemplary view of the pocket of FIG. 1 is shown. As shown in FIG. 7, the pocket is closed at the top portion 110 of the pocket member 108 and open at the bottom portion 112 of the pocket member 108.

Figure 8:
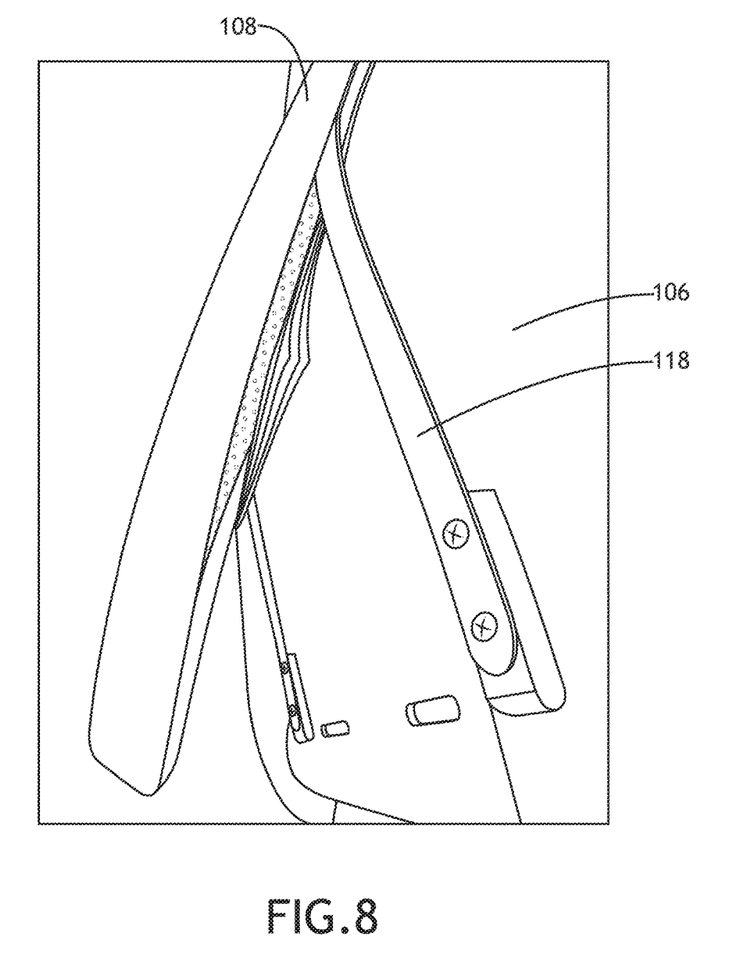
FIG. 8 is an exemplary view of the pocket of FIG. 1 according to the inventive concepts disclosed herein.

Referring now to FIG. 8, an exemplary view of the pocket of FIG. 1 is shown. As shown in FIG. 8, the pocket is closed at the top portion 110 of the pocket member 108 and open at the bottom portion 112 of the pocket member 108.

Figure 9:
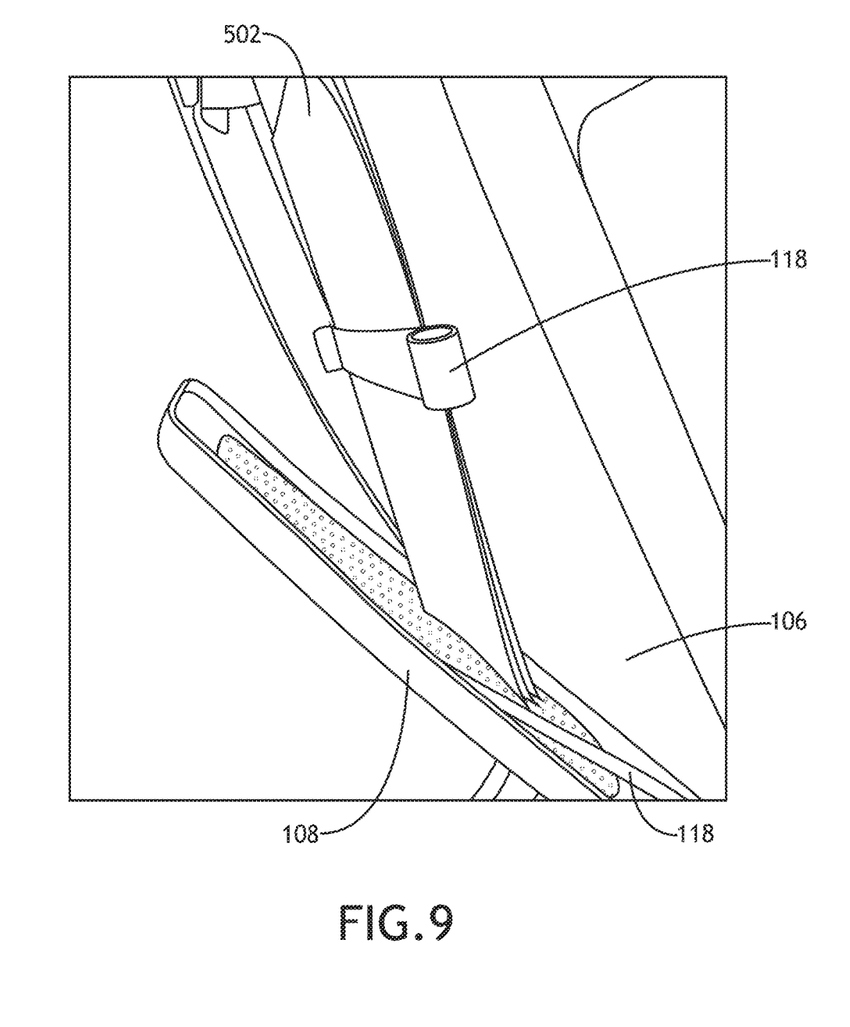
FIG. 9 is an exemplary view of the pocket of FIG. 1 according to the inventive concepts disclosed herein.

Referring now to FIG. 9, an exemplary view of the pocket of FIG. 1 is shown. As shown in FIG. 6, the pocket is open at the top portion 110 of the pocket member 108 and closed at the bottom portion 112 of the pocket member 108.

Figure 10:
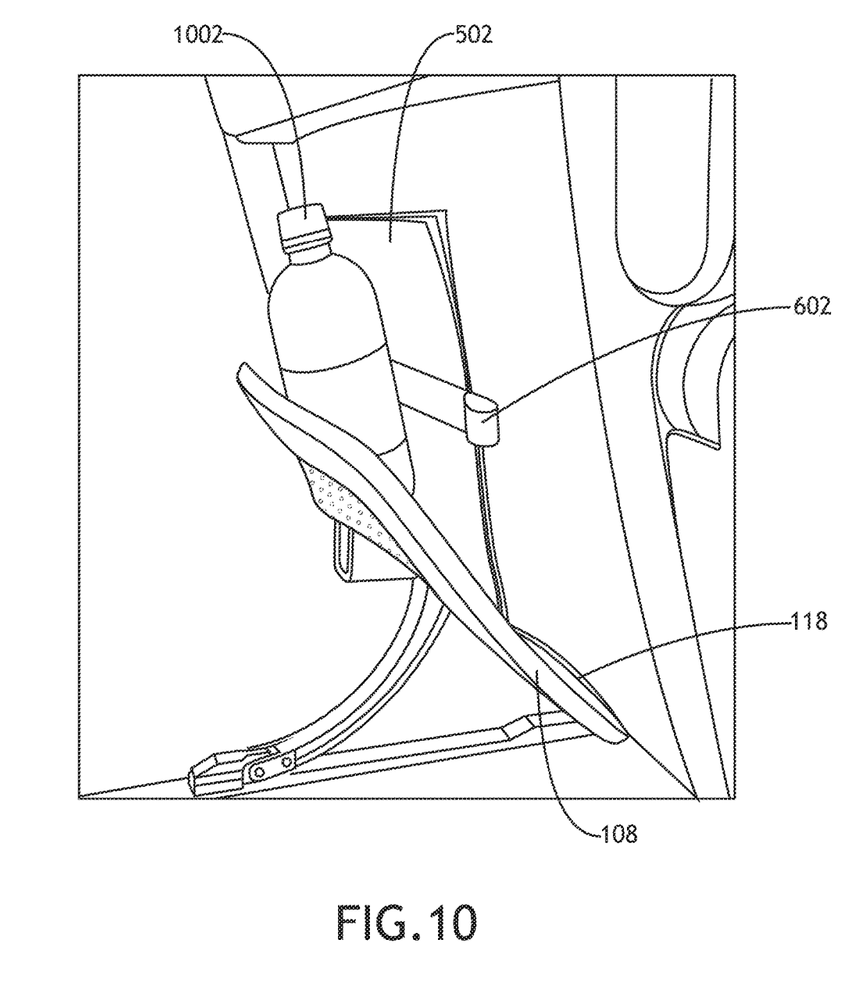
FIG. 10 is an exemplary view of the pocket of FIG. 1 according to the inventive concepts disclosed herein.

Referring now to FIG. 10, an exemplary view of the pocket of FIG. 1 is shown. As shown in FIG. 10, the pocket may be configured to hold object(s) (e.g., bottle 1002) in the pocket by applying a friction force due to spring properties of the spring members 118.

Figure 11:
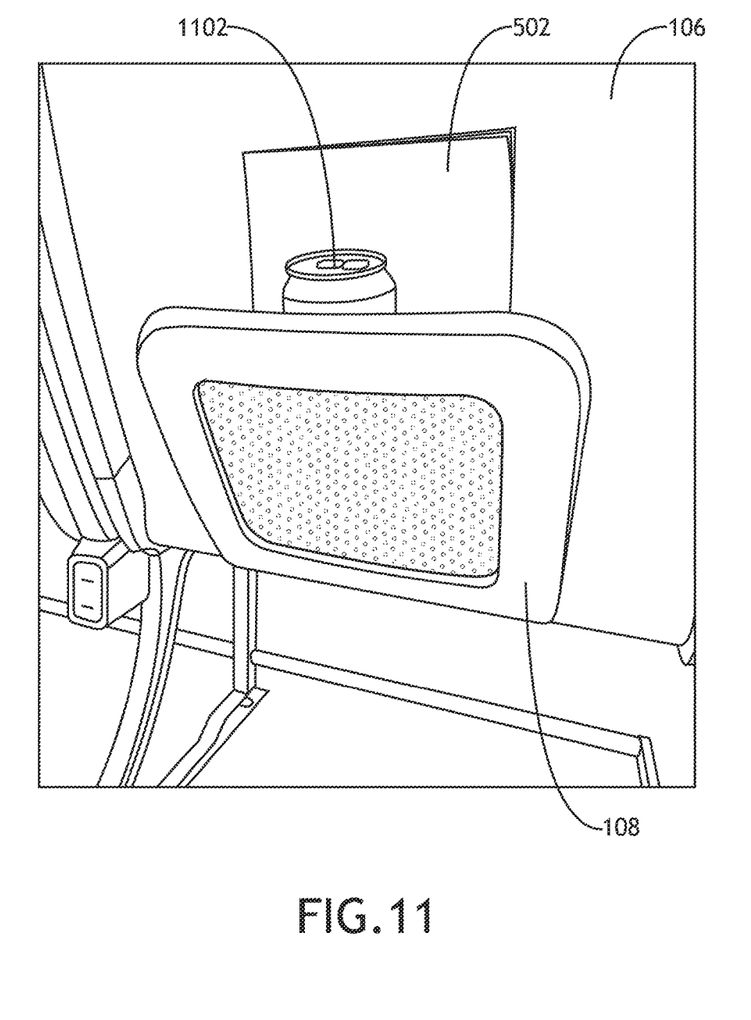
FIG. 11 is an exemplary view of the pocket of FIG. 1 according to the inventive concepts disclosed herein.

Referring now to FIG. 11, an exemplary view of the pocket of FIG. 1 is shown. As shown in FIG. 10, the pocket may be configured to hold object(s) (e.g., can 1102) in the pocket by applying a friction force due to spring properties of the spring members 118.

As will be appreciated from the above, embodiments of the inventive concepts disclosed herein may be directed to a system including a pocket.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a seat comprising a seat back including a surface;
   a pocket member having a top portion, a bottom portion, an exterior side, and an interior side; and
   a pocket member spring means consisting essentially of two spring members, each of the two spring members extending lengthwise vertically between the surface and the interior side of the pocket member, each of the two spring members having a spring top portion and a spring bottom portion, each of the spring top portions being attached to the top portion of the pocket member, each of the spring bottom portions being attached to the surface at a location corresponding to a vertical position of the bottom portion of the pocket member;
   wherein each of the spring bottom portions are not attached to the bottom portion of the pocket member;
   wherein the pocket member is attached to the seat back solely by the two spring members and only selectively abuts the seat back at portions of the interior side of the pocket member such that at the portions of the pocket member that do not abut the seat back, the pocket member is open; and
   wherein the surface, the pocket member, and the two spring members form a pocket configured to at a given time be one of: open at the top portion of the pocket member, open at the bottom portion of the pocket member, or closed.

2. The system of claim 1, wherein the two spring members are configured to maintain the pocket as closed when an external force is not acting on the pocket member.

3. The system of claim 1, further comprising a vehicle, the vehicle comprising the seat.

4. The system of claim 3, wherein the vehicle is an aircraft.

5. The system of claim 4, wherein the aircraft comprises a multiple seat assembly, the multiple seat assembly comprising the seat.

6. The system of claim 2, wherein each of the two spring members is a spring strip having flat surface portions on opposite sides of the spring strip.

7. The system of claim 6, wherein each of the two spring members is composed of spring steel.

8. The system of claim 7, wherein each of the spring top portions is attached to the top portion of the pocket member with at least one first fastener, wherein each of the spring bottom portions is attached with at least one second fastener to the surface at a location corresponding to a vertical position of the bottom portion of the pocket member.

9. The system of claim 8, wherein the pocket member includes at least one rigid portion extending between vertical positions corresponding to positions of the spring top portion and the spring bottom portion of each of the two spring members.

10. The system of claim 9, wherein the pocket member includes at least one non-rigid portion positioned horizontally between horizontal positions corresponding to positions of the two spring members.

11. The system of claim 10, wherein the at least one non-rigid portion is composed of mesh.

12. The system of claim 8, further comprising a first spacer and a second spacer, wherein each of the at least one second fastener passes through one of the two spring members, one of the first spacer or the second spacer, and the surface.

13. The system of claim 12, wherein the surface has at least one curve, wherein the interior side of the pocket member conforms to the surface, wherein the two spring members are pre-bent to conform to the surface when an external force is not acting on the pocket member.

14. The system of claim 8, wherein the at least one first fastener is at least two rivets, wherein the at least one second fastener is at least two screws.

* * * * *